(12) United States Patent
Brint

(10) Patent No.: US 6,658,782 B2
(45) Date of Patent: Dec. 9, 2003

(54) ANIMATED DECOYS

(76) Inventor: George W. Brint, 3760 Forest Hill Rd., Bolivar, TN (US) 38003

( * ) Notice: Subject to any disclaimer, the term of this patent is extended or adjusted under 35 U.S.C. 154(b) by 0 days.

(21) Appl. No.: 10/307,581

(22) Filed: Dec. 2, 2002

(65) Prior Publication Data

US 2003/0079397 A1 May 1, 2003

Related U.S. Application Data

(62) Division of application No. 09/904,480, filed on Jul. 16, 2001.
(60) Provisional application No. 60/265,756, filed on Feb. 1, 2001.

(51) Int. Cl.$^7$ .............................................. A01M 31/06
(52) U.S. Cl. ........................................................ 43/2
(58) Field of Search .......................... 43/2, 3; 446/325, 446/351, 396, 486, 369, 370

(56) References Cited

U.S. PATENT DOCUMENTS

| 843,588 A | * | 2/1907 | Ditto | 43/3 |
| 1,813,277 A | * | 7/1931 | Churus | 446/325 |

(List continued on next page.)

FOREIGN PATENT DOCUMENTS

| DE | 226674 B1 | * | 10/1910 | 43/3 |
| FR | 402382 B1 | * | 8/1909 | 43/2 |
| FR | 848634 B1 | * | 11/1939 | 43/3 |
| GB | 389522 B1 | * | 3/1933 | 43/2 |
| GB | 611844 B1 | * | 11/1948 | 43/2 |
| GB | 966386 B1 | * | 8/1964 | 43/2 |
| GB | 2067064 B1 | * | 7/1981 | 43/2 |
| IT | 471206 B1 | * | 5/1952 | |
| IT | 624517 B1 | * | 9/1961 | 43/2 |

OTHER PUBLICATIONS

Cabelas Annual Fall Catalog–2002 p. 261 "Motion Rabbit" advertisement.

*Primary Examiner*—Darren W. Ark
(74) *Attorney, Agent, or Firm*—John M. Harrison

(57) ABSTRACT

Animated decoys each having a flexible decoy body which is supported on a self-contained decoy movement device that imparts life-like movement to the decoy body. In a first preferred embodiment, the decoy body is formed of a flexible sheet material such as rubber or foam rubber, typically in the two-dimensional shape of a fowl, and includes an opening which inserts on a cylindrical collar provided on the decoy movement device. The decoy movement device is supported on the upper end of a tapered spring which is provided on the upper end of an elongated, flexible support rod, the lower end of which support rod is typically inserted in the ground. The tapered spring permits life-like feeding or swimming movements of the decoy body imparted by the decoy movement device to attract predators or other fowl for photography, observation or hunting purposes. In a second embodiment, the decoy body is constructed in the three-dimensional size and shape of a turkey, hen, deer or other fowl or mammal and includes an interior pocket or pockets for receiving respective decoy movement devices which impart life-like motions to the decoy body.

6 Claims, 4 Drawing Sheets

U.S. PATENT DOCUMENTS

| | | | | |
|---|---|---|---|---|
| 2,095,871 A | * | 10/1937 | Hite | 446/325 |
| 2,554,516 A | * | 5/1951 | Anthony | 446/325 |
| 2,611,214 A | * | 9/1952 | Schur | 446/325 |
| 2,611,997 A | * | 9/1952 | Solloway et al. | 446/325 |
| 2,663,108 A | * | 12/1953 | Dixon et al. | 43/3 |
| 2,709,079 A | * | 5/1955 | Bubb et al. | 446/486 |
| 3,172,223 A | * | 3/1965 | Stager | 43/2 |
| 3,252,242 A | * | 5/1966 | Zalkind | 446/369 |
| 3,557,436 A | * | 1/1971 | Hodes | 446/370 |
| 3,921,331 A | * | 11/1975 | Schatz | 446/325 |
| 4,566,214 A | * | 1/1986 | McCrory et al. | 43/3 |
| 4,611,421 A | * | 9/1986 | Jacob | 43/2 |
| 4,614,505 A | * | 9/1986 | Schneider et al. | 446/369 |
| 4,650,701 A | * | 3/1987 | Jackson | 446/370 |
| 4,689,913 A | * | 9/1987 | Brice | 43/3 |
| 4,893,428 A | * | 1/1990 | Gagnon, Sr. | 43/3 |
| 4,931,029 A | * | 6/1990 | Hwang | 446/396 |
| 4,965,953 A | | 10/1990 | McKinney | 43/2 |
| 5,003,722 A | * | 4/1991 | Berkley et al. | 43/3 |
| 5,069,650 A | * | 12/1991 | Lehmann et al. | 446/486 |
| 5,100,360 A | * | 3/1992 | Entzel | 446/396 |
| 5,322,036 A | * | 6/1994 | Merino | 446/325 |
| 5,515,637 A | | 5/1996 | Johnson | 43/2 |
| 5,632,110 A | * | 5/1997 | Roy | 43/2 |
| 5,636,466 A | * | 6/1997 | Davis | 43/3 |
| 5,682,702 A | * | 11/1997 | McKnight et al. | 43/3 |
| 5,720,644 A | * | 2/1998 | Ku | 446/351 |
| 5,901,491 A | * | 5/1999 | Caldwell | 43/2 |
| 5,926,990 A | * | 7/1999 | Okimoto | 43/2 |
| 6,021,594 A | | 2/2000 | Krueger | 43/2 |
| 6,070,356 A | | 6/2000 | Brint et al. | 43/2 |
| 6,092,322 A | | 7/2000 | Samaras | 43/2 |
| 6,129,606 A | | 10/2000 | Yuen | 446/325 |
| 6,212,816 B1 | | 4/2001 | Babbitt et al. | 43/3 |
| 6,216,382 B1 | | 4/2001 | Lindaman | 43/2 |
| 6,266,912 B1 | | 7/2001 | Jirele | 43/2 |
| 6,273,779 B1 | * | 8/2001 | Boulaire | 446/325 |
| 6,374,529 B1 | | 4/2002 | Petroski et al. | 43/3 |
| 6,385,895 B1 | | 5/2002 | Scaries | 43/2 |
| 6,574,902 B1 | * | 6/2003 | Conger | 43/2 |

* cited by examiner

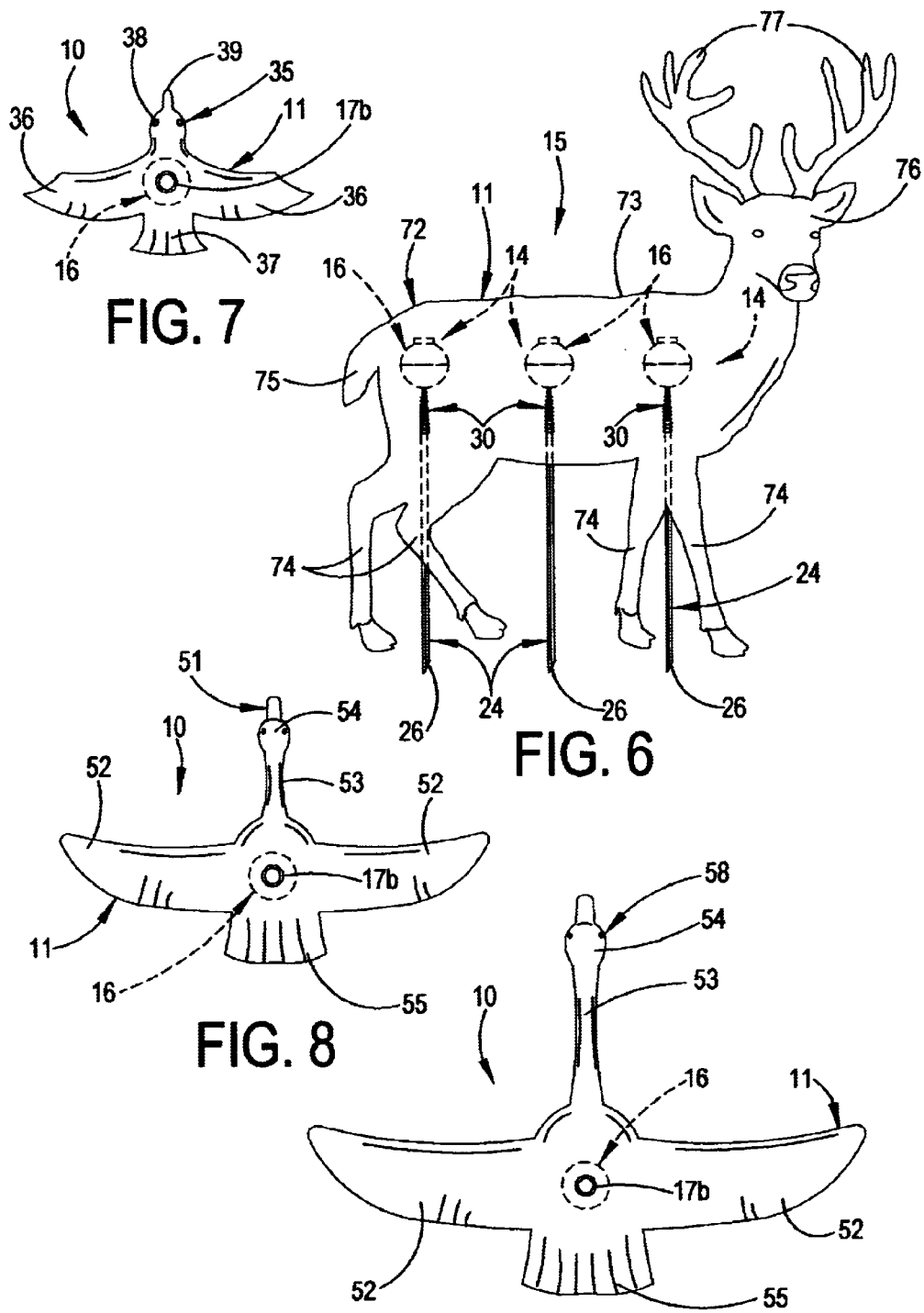

ANIMATED DECOYS

CROSS-REFERENCE TO RELATED APPLICATIONS

This application is a divisional of copending U.S. application Ser. No. 09/904,480, filed Jul. 16, 2001 which claims the benefit of Provisional application No. 60/265,756 filed Feb. 1, 2001.

BACKGROUND OF THE INVENTION

1. Field of the Invention

This invention relates to animated decoys for use by hunters and photographers and more particularly, to lightweight, flexible animated decoys each having a flexible decoy body which is supported on a self-contained decoy movement device that imparts life-like movement to the decoy body. In a first preferred embodiment, the decoy body is formed of a flexible sheet material such as rubber or foam rubber, typically in the two-dimensional size and shape of a fowl, and includes a central opening which inserts on a cylindrical collar provided on the decoy movement device. The decoy movement device is supported on the upper end of a tapered spring which is provided on the upper end of an elongated support rod, the lower end of which support rod is typically inserted in the ground. The tapered spring facilitates life-like feeding, walking, flying (in the case of a fowl) panic or foraging movements of the decoy body, imparted by the decoy movement device, to attract predators or other wild animals for photography, observation or hunting purposes. In a second embodiment, the decoy body is constructed in the three-dimensional size and shape of a turkey, hen, deer or mammal and includes an interior pocket or pockets for receiving the respective decoy movement device or devices, which impart the life-like motions to the decoy body.

2. Description of the Prior Art

Decoys of great variety in construction and purpose have been used for centuries to lure wild animals for hunting or observation and study. While decoys often simulate a life-like appearance of an animal, many decoys are stationary and thus, cannot mimic life-like movements of the animal. Some animated-type decoys capable of movement are designed to move with the forces of nature, such as by the action of wind or water. However, imperfect conditions and inherent limitations in the design and surrounding environment generally cause those decoys to exhibit a typical or unrealistic movements which may startle or warn the intended lured wild animal or have no luring effect.

In an attempt to remedy the above-mentioned problems associated with nature-actuated animated decoys, several types of mechanized decoys, including remote-controlled decoys, have been designed. A major disadvantage of most mechanized decoys is that the mechanism used for imparting movement to the decoys forms a permanent part of the decoy design itself. As such, those decoys, particularly those having moving extremities, are complex structures and are often unreliable and difficult to store and transport as well as to assemble and operate. Moreover, they tend to have a limited range of capabilities and too often, provide poor simulation of some animal movements. Accordingly, an animated decoy is needed which is simple in construction, easy to assemble, transport and operate, and capable of accurately emulating a wide variety of typical or appropriate game or feral animal behavioral patterns or movements.

It is therefore an object of this invention to provide animated decoys each of which includes a self-contained decoy movement device for imparting life-like movements to a flexible decoy body of selected appearance and design.

Another object of the invention is to provide animated decoys which are capable of mimicking feeding movements of deer or other wildlife, swimming or feeding movements of waterfowl, or panic movements of wounded deer or small mammals in order to attract predators such as foxes, coyotes, bobcats, mountain lions or bears and the like.

Another object of this invention is to provide an animated decoy characterized by a support; a spring provided on the support; a decoy movement device supported by the spring; and a flexible decoy body supported on the decoy movement device, wherein the spring facilitates life-like movements of the decoy body, imparted by the decoy movement device.

Still another object of the invention is to provide an animated decoy including a decoy body typically constructed of a flexible material such as rubber or foam rubber and shaped in the two-dimensional size and configuration of a fowl for simulating life-like movements, including flying, of a fowl, in order to attract predators or wild animals for hunting, observation or photography.

A still further object of this invention is to provide an animated decoy characterized by a spring-mounted, self-contained decoy movement device on which is mounted a flexible decoy body that resembles the two-dimensional size and shape of a fowl or other wild animal, which decoy movement device includes a cylindrical collar for insertion in a collar opening provided in the decoy body and a retainer washer and cotter pin for mounting the decoy body on the decoy movement device.

Yet another object of this invention is to provide an animated decoy characterized by an elongated support rod, the lower end of which is adapted for insertion in the ground; a decoy movement device provided on the upper end of the support rod; a collar provided on the decoy movement device; and a flexible decoy body having a collar opening for receiving the collar and mounting the decoy body on the decoy movement device, which decoy movement device includes a housing provided on the support rod; a motor provided in the housing; an eccentric weight disposed in the housing and connected in cantilever fashion to the motor, wherein the motor of the decoy movement device rotates the weight in the housing and imparts animated movements to the decoy body to attract wild animals or game.

Another object of the invention is to provide an animated decoy characterized by a decoy body which is shaped in the three-dimensional size and configuration of a turkey, hen, deer or other fowl or mammal, which decoy body is flexible and includes a pocket or pockets for receiving respective decoy movement devices and imparting life-like animated movements such as feeding (and flying in the case of fowl), or panic movements to the decoy body to attract predators for hunting, observation or photography purposes.

SUMMARY OF THE INVENTION

These and other objects of the invention are provided in new and improved, animated decoys each having a flexible decoy body which is supported on a self-contained decoy movement device that imparts life-like movements to the decoy body in order to attract predators for hunting, observation or photography. In a first preferred embodiment, the decoy body is formed of a flexible sheet material such as rubber or foam rubber, typically in the two-dimensional shape of a fowl, and includes an opening which inserts on a cylindrical collar provided on the decoy movement device. The decoy movement device is supported on the upper end of a tapered spring which is provided on the upper end of an elongated support rod, the lower end of which support rod is typically inserted in the ground. The tapered spring facilitates life-like feeding or swimming movements of the decoy body, imparted by the decoy movement device, to attract predators for photography, observation or hunting purposes. In a second embodiment, the decoy body is constructed in the three-dimensional size and shape of a turkey, hen, deer or other fowl or mammal and includes an interior pocket or pockets for receiving the respective decoy movement device or devices which impart life-like motions (including flying in the case of fowl), such as panic movements to the decoy body.

BRIEF DESCRIPTION OF THE DRAWINGS

The invention will be better understood by reference to the accompanying drawings, wherein:

FIG. 6 is a side view of a deer embodiment of the animated decoys, utilizing three decoy movement devices;

FIG. 7 is a top view of the crow decoy embodiment of the animated decoys illustrated in FIG. 1;

FIG. 8 is a top view of a duck decoy embodiment of the animated decoys;

FIG. 9 is a top view of a goose decoy embodiment of the animated decoys;

DESCRIPTION OF THE PREFERRED EMBODIMENTS

Figure 1:
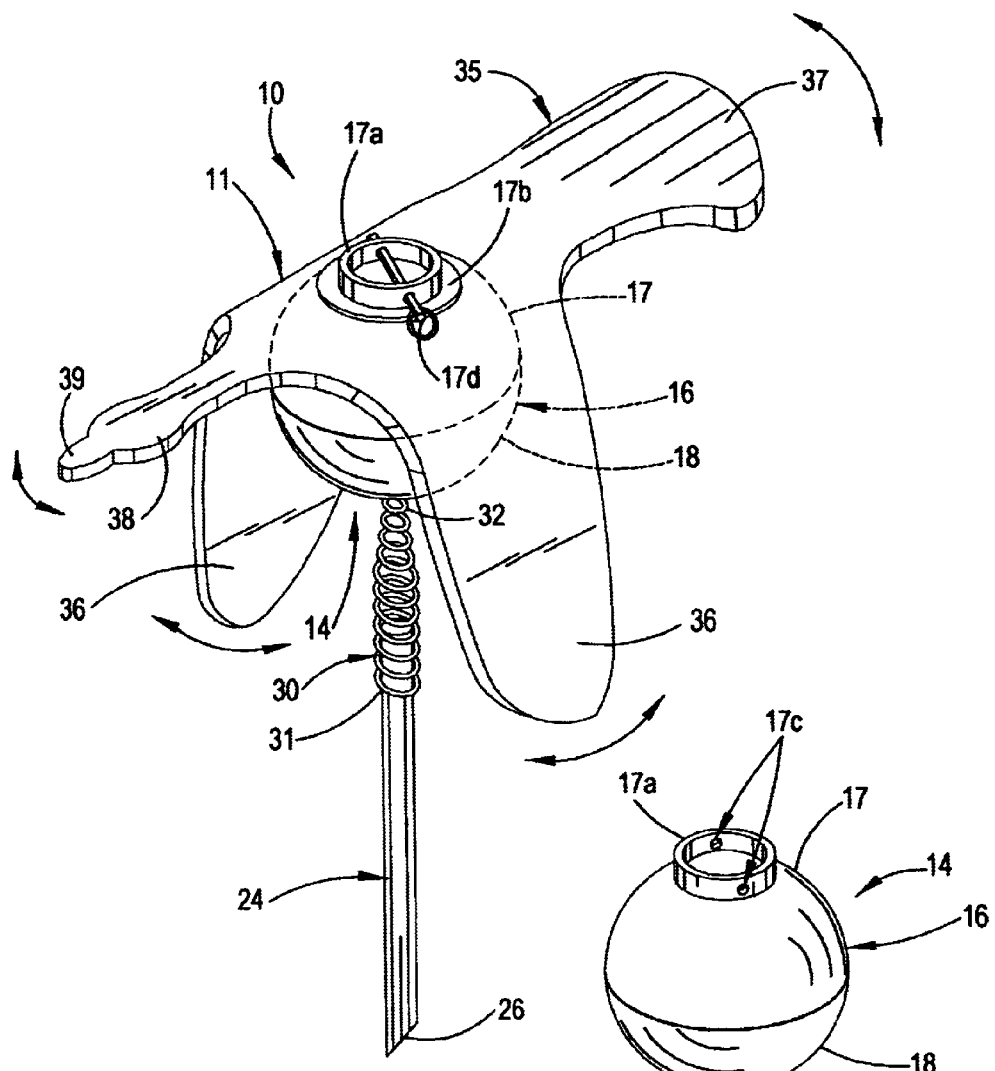
FIG. 1 is a perspective view of a preferred, crow decoy embodiment of the animated decoys of this invention.

Referring initially to FIGS. 1–3 and 7 of the drawings, in a first preferred embodiment an animated decoy of this invention is generally illustrated by reference numeral 10 and is characterized by a crow decoy 35, including a flexible decoy body 11 which is typically constructed from a sheet of rubber or foam rubber and shaped and colored to resemble the size, configuration and appearance of a crow. Accordingly, the decoy body 11 of the crow decoy 35 illustrated in FIGS. 1 and 7 typically includes a pair of wings 36, a fanned tail 37 and a head 38 having a pointed beak 39. A central collar opening (not illustrated) is provided in the decoy body 11, between the wings 36 for purposes which will be hereinafter described.

Figure 2:
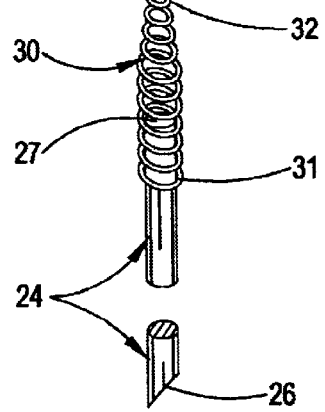
FIG. 2 is a perspective view of the decoy movement device, tapered spring and support rod (partially in section) elements of the animated decoys.
Figures 3, 5:
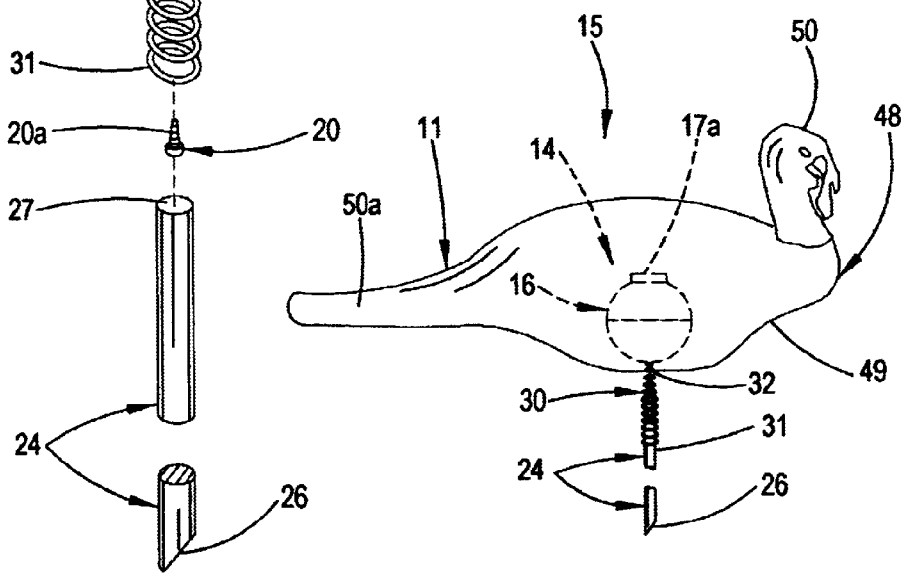
FIG. 3 is an exploded, perspective view of the decoy movement device, tapered spring and support rod (partially in section) elements of the animated decoys.
FIG. 5 is a side view, partially in section, of a hen decoy embodiment of the animated decoys, with the decoy movement device (in phantom) shown in a low position inside the decoy body of the hen decoy.

As illustrated in FIGS. 1–3 of the drawings, the animal decoy 10 further includes a decoy movement device 14, which is detailed in my U.S. Pat. No. 6,070,356 and the purpose of which will be hereinafter described. The decoy movement device 14 includes a spherical housing 16 having a domed upper portion 17 which typically threadibly engages the circular attachment lip 18a of a correspondingly-shaped lower portion 18 of the housing 16, as illustrated in FIG. 3. The housing 16 is mounted on the narrow upper end 32 of a tapered spring 30, typically by extending the shank 20a of an inverted screw 20 through the looped upper end 32 of the spring 30, and threading the shank 20a of the screw 20 into the lower portion 18 of the housing 16. The lower looped end 31 of the spring 30 is secured to the upper end portion 27 of an elongated support rod 24 according to the knowledge of those skilled in the art, the lower end 26 (FIG. 1) of which support rod 24 is typically beveled, as illustrated, or pointed (not illustrated) for easy insertion of the support rod 24 in the ground (not illustrated) in application of the animated decoy 10 as hereinafter described.

Briefly, and referring again to FIG. 3, the decoy movement device 14 typically includes a battery-operated electric motor 19 which engages a stationary motor shaft 19a, attached to the lower portion 18 of the housing 16, and an eccentric weight 21 is mounted in cantilever fashion on the electric motor 19. As the electric motor 19 engages and rotates on the stationary motor shaft 19a, the attached cantilevered eccentric weight 21 traverses a circular path in the spherical housing 16 surrounding the motor shaft 19a, and applies dynamic weight pressure to the motor shaft 19a along the circumference thereof, thereby constantly varying the weight distribution on the motor shaft 19a such that the housing 16 tends to wobble in a circular motion on the resilient spring 30, for purposes which will be hereinafter described.

As further illustrated in FIGS. 1–3, a collar 17a is typically provided in upward-standing relationship on the upper portion 17 of the housing 16 of the decoy movement device 14. Accordingly, the decoy body 11 is removably mounted on the housing 16 by inserting the collar 17a through the central collar opening (not illustrated, provided between the wings 36 of the decoy body 11 of the crow decoy 35 illustrated in FIGS. 1 and 7), and fitting a retainer washer 17b around the collar 17a and against the upper surface of the decoy body 11. A cotter pin 17d is extended through a pair of aligned cotter pin openings 17c, provided in the collar 17a, to engage and secure the retainer washer 17b against the decoy body 11 in conventional fashion and secure the decoy body 11 on the collar 17a.

Referring again to FIG. 1 of the drawings, in typical application of the animated decoy 10, the decoy body 11 is mounted on the decoy movement device 14 in the manner heretofore described. The beveled lower end 26 of the support rod 24 is inserted a sufficient distance into the ground (not illustrated) to facilitate free-standing vertical support of the support rod 24 in the ground, with the wings 36 of the decoy body 11 typically touching the ground. The decoy movement device 14 is activated by manipulating a switch (not illustrated), typically provided on the upper portion 17 of the housing 16 and accessed through the collar 17a, whereupon the eccentric weight 21 (FIG. 3) rotates by operation of the electric motor 19 in the housing 16 in the circular path surrounding the motor shaft 19a. This motion of the eccentric weight 21 in the housing 16 causes the cantilevered weight 21 to exert a constantly-changing weight load against the motor shaft 19a around the circumference thereof, and the motor shaft 19a transmits those changing weight loads to the lower portion 18 of the housing 16 to cause the housing 16 to move in a circular, wobbling motion on the tapered spring 30. Consequently, the decoy body 11, mounted on the housing 16 as heretofore described, tends to move in a simulated flying, wobbling or shaking motion, with the wings 36, tail 37 and beak 39 of the decoy body 11 moving in a side-to-side motion, as indicated by the curved arrows, to mimic the life-like flying, swimming or feeding actions of a crow in the air on the ground or on water, for example. Accordingly, crow or other fowl flying overhead in the vicinity of the animated decoy 10, or predatory wild animals on the ground, are attracted to the wobbling decoy body 11 and thus, approach the area surrounding the animated decoy 10 in search for food or in preparation for attacking the decoy body 11. The animated decoy 10 is typically placed in close proximity to a hunting blind (not illustrated) or to a hidden photographer, such that the fowl are in close firing range of a hunter or hunters in the hunting blind, or within filming range of the photographer.

Referring next to FIGS. 8 and 9 of the drawings, it will be appreciated by those skilled in the art that the rubber or foam rubber decoy body 11 can be constructed in the shape of virtually any species of game fowl, as desired. Accordingly, the decoy body 11 illustrated in FIG. 8 is characterized by a duck decoy 51, which approximates the size, shape, colors and proportions of a silk-screened duck having an elongated neck 53, head 54, extended wings 52 and a fanned tail 55. In like manner, those respective features of the decoy body 11 of the goose decoy 58 in FIG. 9 collectively approximate the size, shape, colors and proportions of a silk-screened goose. As described above with respect to the decoy body 11 of the crow decoy 35 illustrated in FIGS. 1 and 7, the decoy body 11 of the duck decoy 51 illustrated in FIG. 8 and of the goose decoy 58 illustrated in FIG. 9, respectively, includes a central collar opening (not illustrated) which receives the cylindrical collar 17a of the decoy movement device 14, and the decoy body 11 is secured on the collar 17a typically by means of the cotter pin 17d (FIG. 1). The decoy body 11 moves in a simulated flying, wobbling, bobbing or shaking motion to resemble fowl flying, swimming or feeding motions and thus, attract ducks, geese or predators or other wild game to the area surrounding the animated decoy 10.

Figure 4:
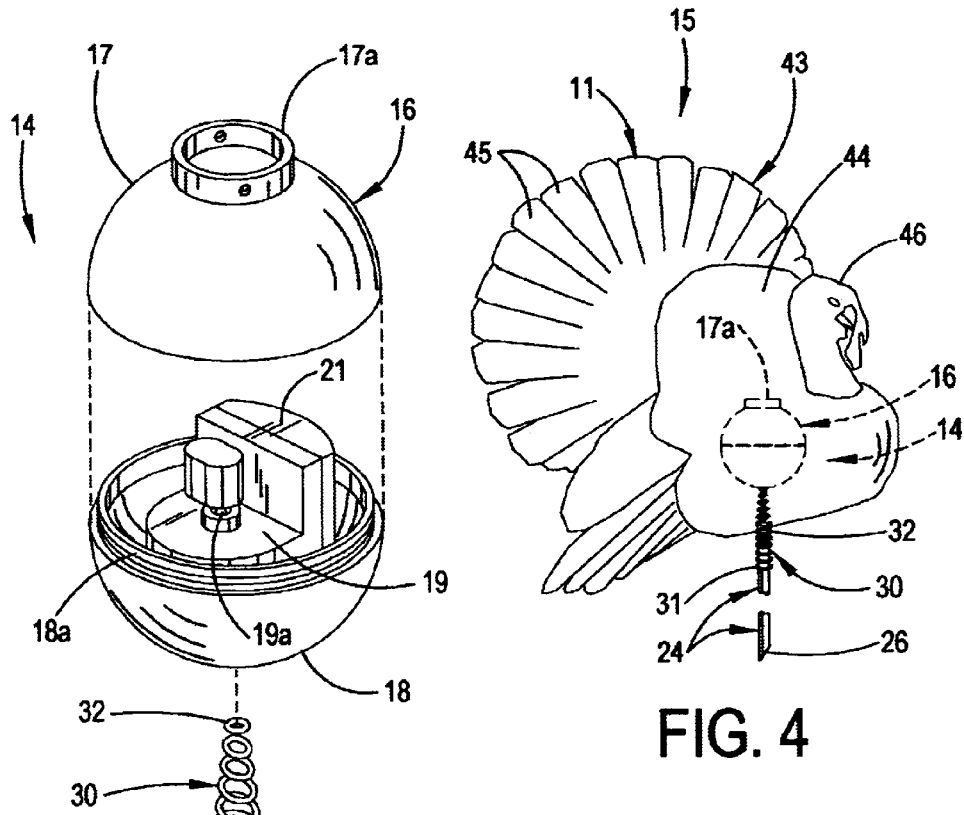
FIG. 4 is a side view, partially in section, of a turkey decoy embodiment of the animated decoys, with the decoy movement device (in phantom) shown in a low position inside the decoy body of the turkey decoy.
Figure 10:
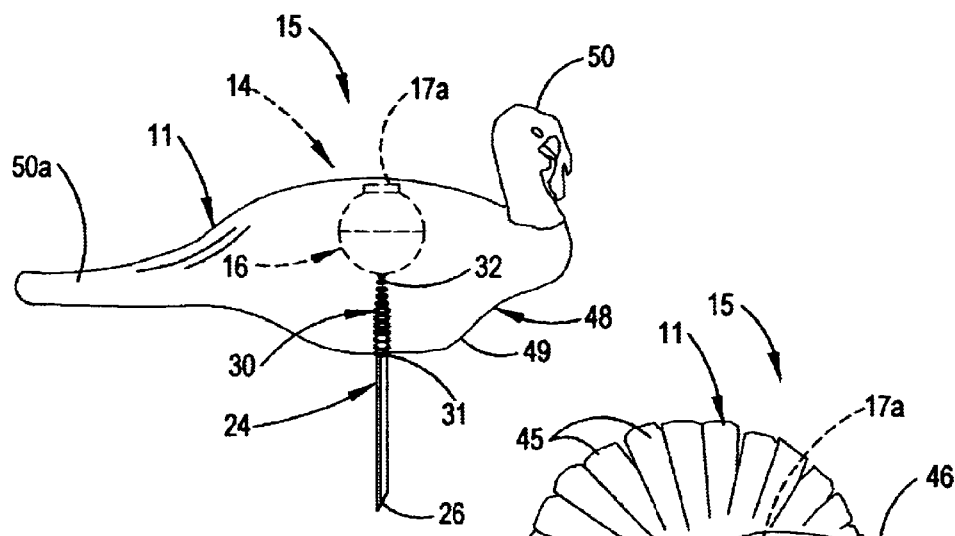
FIG. 10 is a side view, partially in section, of a hen decoy embodiment of the animated decoys, with the decoy movement device (in phantom) in a high position in the decoy body of the hen decoy.
Figure 11:
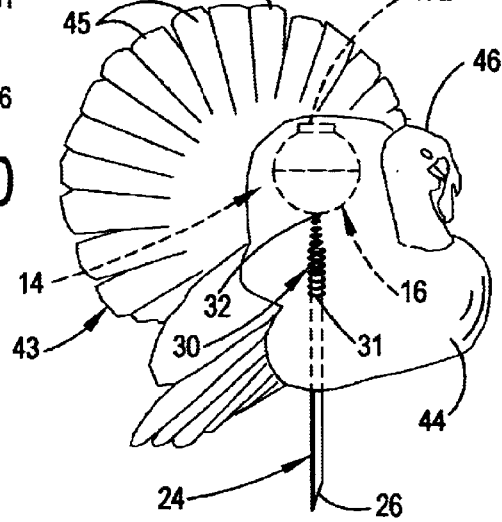
FIG. 11 is a side view, partially in section, of a turkey decoy embodiment of the animated decoys, with the decoy movement device (in phantom) in a high position in the decoy body of the turkey decoy.

Referring next to FIGS. 4–6 and 10–12 of the drawings, in another embodiment the animated decoy of this invention is generally illustrated by reference numeral 15, the decoy body 11 of which includes one or multiple interior pockets (not illustrated) which receive respective decoy movement devices 14, mounted on respective tapered springs 30 and corresponding support rods 24 as heretofore described with respect to FIGS. 1–3. As illustrated in FIGS. 4 and 11, a turkey decoy 43 of the animated decoy 15 is constructed in the shape of a turkey, having a body 44, a plume 45 and a head 46. The decoy body 11 of the turkey decoy 43 is typically constructed of foam rubber, fabric or other flexible material, and the interior pocket (not illustrated) of the decoy body 11 is provided in the simulated body 44 of the turkey decoy 43 for snugly receiving the spherical housing 16 of the decoy movement device 14 (illustrated in phantom in FIG. 4). The decoy movement device 14 can be placed in either a low position inside the decoy body 11, as illustrated in FIG. 4, or in a high position inside the decoy body 11, as illustrated in FIG. 11, depending on the desired movements of the decoy body 11. Accordingly, operation of the decoy movement device 14 in the manner heretofore described with respect to FIGS. 1–3 imparts a simulated flying, wobbling or shaking motion to the decoy body 11, which motion resembles the life-like feeding, breeding, flying, strutting or panic movements of a turkey and attracts turkeys or wildlife predators to the area.

As illustrated in FIGS. 5 and 10, the decoy body 11 of a hen decoy 48 of the animated decoy 15 is constructed in the shape of a hen, having a body 49, a head 50 and a tail 50a. The decoy body 11 of the hen decoy 48 is constructed of a flexible material such as foam rubber or fabric, in non-exclusive particular, and includes an interior pocket (not illustrated) provided in the simulated body 49 of the hen decoy 48 for receiving the spherical housing 16 (illustrated in phantom) of a decoy movement device 14, mounted on a tapered spring 30 and corresponding support rod 24 as heretofore described with respect to FIGS. 1–3. As described above with respect to the turkey decoy 43 illustrated in FIGS. 4 and 11, the decoy movement device 14 can be placed in either a low position inside the decoy body 11, as illustrated in FIG. 5, or in a high position inside the decoy body 11, as illustrated in FIG. 10, depending on the desired movements of the decoy body 11. Accordingly, operation of the decoy movement device 14 in the manner heretofore described with respect to FIGS. 1–3 imparts a life-like simulated flying, wobbling or shaking motion to the decoy body 11 of the hen decoy 48, which motion resembles fowl feeding, flying or swimming motions and attracts fowl to the area.

As illustrated in FIG. 6, the decoy body 11 of a deer decoy 72 of the animated decoy 15 is constructed in the size and shape of a deer, having a body 73, legs 74, a tail 75, a head 76 and antlers 77. The decoy body 11 of the deer decoy 72 is constructed of a flexible material such as foam rubber or fabric, and includes three pockets (not illustrated) provided in the simulated body 73 of the deer decoy 72 for receiving the spherical housing 16 (illustrated in phantom) of each of three decoy movement devices 14, mounted on respective tapered springs 30 and corresponding support rods 24 as heretofore described with respect to FIGS. 1–3. Operation of the decoy movement device 14 in the manner heretofore described with respect to FIGS. 1–3 imparts a life-like wobbling or shaking motion to the decoy body 11 of the deer decoy 72, which motion resembles panic movements of a wounded deer and attracts predators such as foxes, coyotes, bobcats, mountain lions or bears to the area around the decoy body 11.

Figure 12:
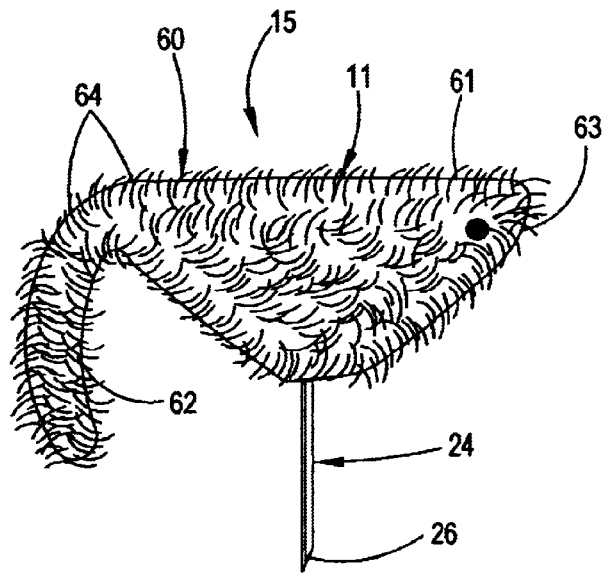
FIG. 12 is a side view of a small mammal decoy embodiment of the animated decoys of this invention.

Referring next to FIG. 12 of the drawings, in yet another embodiment of the animated decoys 15, the decoy body 11 thereof is characterized by a small mammal decoy 60, which resembles the general appearance of small mammals such as rabbits, dogs or groundhogs. The decoy body 11 of the small mammal decoy 60 is typically constructed of a flexible rubber, foam rubber or fabric material, and the surface of the decoy body 11 is typically covered with simulated fur 64. The decoy body 11 typically includes a simulated body 61, eyes 63 and a flexible tail 62 in the general shape of virtually any small mammal, and is fitted with an interior pocket (not illustrated) in the simulated mammal body 61 for receiving the spherical housing 16 (FIG. 2) of a decoy movement device 14, as heretofore described with respect to the embodiments of FIGS. 4, 5, 10 and 11. Accordingly, the support rod 24 extends downwardly from the decoy body 11 and, in application of the animated decoy 15, is inserted in the ground (not illustrated). The decoy movement device 14 is operated to impart the wobbling motions to the decoy body 11, facilitated by the resilient tapered spring 30 (FIG.

2), to mimic the life-like panic movements of a wounded mammal such as a rabbit, dog or groundhog and attract predatory animals for hunting, observation or photography.

It will be appreciated by those skilled in the art that the animated decoys of this invention in the various embodiments are effective in attracting wild animals, particularly predators, to the deployment area for purposes of hunting, observation or photography by mimicking the life-like eating, swimming, panic or other movements of various types of fowl and wild animals. By providing a flexible support for the decoy movement device, the tapered spring element of the invention facilitates the wobbling movements of the decoy movement device on which the decoy body is mounted. It is understood that the various embodiments of the invention described above are illustrative and that decoys which resemble various types of feathered birds or furry mammals can be constructed in such a manner that the decoys are capable of sustaining a life-like, wobbling motion when mounted on the spherical housing of the decoy movement device.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. An animated animal decoy comprising:

a support;

a spring provided on said support;

a housing provided on said spring, a motor provided in said housing and an eccentric weight engaged by said motor, wherein said motor rotates said weight in said housing; and a foam rubber decoy body provided on said housing, said decoy body shaped in the configuration of an animal, whereby said housing and said foam rubber decoy body move and said foam rubber decoy body simulates a live animal responsive to operation of said motor and said eccentric weight in said housing.

2. The animated animal decoy of claim 1 wherein said support comprises an elongated support rod having a lower end for insertion in the ground and an upper end for supporting said spring.

3. An animated decoy comprising:

a support;

a spring provided on said support;

a housing provided on said spring, a motor provided in said housing and an eccentric weight engaged by said motor,; and a decoy body provided on said housing, said decoy body shaped in the configuration of a small mammal and having simulated fur, whereby said decoy body moves and simulates a live small mammal responsive to operation of said motor and said eccentric weight in said housing.

4. The animated decoy of claim 3 wherein said support comprises an elongated support rod having a lower end for insertion in the ground and an upper end for supporting said spring.

5. The animated decoy of claim 3 further comprising a tail extending from said decoy body and simulated tail fur provided on said tail.

6. The animated decoy of claim 5 wherein said support comprises an elongated support rod having a lower end for insertion in the ground and an upper end for supporting said spring.

* * * * *